United States Patent
Strauss et al.

(10) Patent No.: US 9,360,332 B2
(45) Date of Patent: Jun. 7, 2016

(54) METHOD FOR DETERMINING A COURSE OF A TRAFFIC LANE FOR A VEHICLE

(71) Applicant: Continental Teves AG & Co. oHG, Frankfurt (DE)

(72) Inventors: Matthias Strauss, Pfungstadt (DE); Matthias Komar, Frankfurt am Main (DE); Dirk Waldbauer, Eppstein (DE); Wolfgang Guenther, Seligenstadt (DE); Stefan Lueke, Bad Homburg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/409,051

(22) PCT Filed: Aug. 9, 2013

(86) PCT No.: PCT/DE2013/200115
§ 371 (c)(1),
(2) Date: Dec. 18, 2014

(87) PCT Pub. No.: WO2014/032664
PCT Pub. Date: Mar. 6, 2014

(65) Prior Publication Data
US 2015/0149076 A1 May 28, 2015

(30) Foreign Application Priority Data
Aug. 27, 2012 (DE) .................. 10 2012 107 885

(51) Int. Cl.
*G06K 9/62* (2006.01)
*G01S 17/89* (2006.01)
(Continued)

(52) U.S. Cl.
CPC . *G01C 21/34* (2013.01); *B60R 1/00* (2013.01); *G06K 9/00798* (2013.01); *G06K 9/4647* (2013.01); *B60R 2300/102* (2013.01); *B60R 2300/804* (2013.01); *G01S 17/936* (2013.01)

(58) Field of Classification Search
CPC .......... G01C 21/26; G01C 21/34; G06K 9/62; G06K 9/4604; G01S 17/89; B60W 30/12

USPC .......... 701/410, 431, 437; 348/113, 116, 104, 348/148; 382/291
See application file for complete search history.

(56) References Cited

U.S. PATENT DOCUMENTS 5,991,427 A * 11/1999 Kakinami ............ G06K 9/4604
340/903
6,014,601 A 1/2000 Gustafson
(Continued)

FOREIGN PATENT DOCUMENTS

DE 197 38 764 3/1999
DE 103 55 807 7/2004
(Continued)

OTHER PUBLICATIONS

PCT International Search Report of the International Searching Authority for International Application PCT/DE2013/200115, mailed Oct. 25, 2013, 2 pages, European Patent Office, HV Rijswijk, Netherlands.
(Continued)

*Primary Examiner* — Tan Q Nguyen
(74) *Attorney, Agent, or Firm* — W. F. Fasse

(57) ABSTRACT

In a method for determining a course of a traffic lane for a vehicle (10), structures that demarcate a trafficable space are detected in image data from an image acquisition unit (2), and these structures are plotted on a surroundings map (20) that subdivides the surroundings of the vehicle into a two-dimensional grid (20a) of cells (21). The position of the vehicle in the grid of the surroundings map is determined and updated by odometric data. The distance and the direction of the vehicle (10) relative to those cells (21b) of the grid (20a) having structures that demarcate the pavement and/or the traffic lane are determined. Brightness transitions in the image data are detected and are plotted on the cells (21) of the grid (20a). The course of the traffic lane (22) is determined from the cells with the detected brightness transitions.

11 Claims, 3 Drawing Sheets

(51) Int. Cl.
    *G01C 21/34*    (2006.01)
    *G06K 9/00*     (2006.01)
    *G06K 9/46*     (2006.01)
    *B60R 1/00*     (2006.01)
    *G01C 21/26*        (2006.01)
    *G01S 17/93*        (2006.01)

(56) References Cited

U.S. PATENT DOCUMENTS

| | | | |
|---|---|---|---|
| 6,269,308 B1 * | 7/2001 | Kodaka | B62D 15/0265 340/435 |
| 6,433,679 B1 | 8/2002 | Schmid | |
| 6,498,972 B1 | 12/2002 | Rao et al. | |
| 7,138,909 B2 | 11/2006 | Winner | |
| 7,382,236 B2 | 6/2008 | Maass et al. | |
| 7,486,803 B2 | 2/2009 | Camus | |
| 7,495,550 B2 | 2/2009 | Huang et al. | |
| 7,680,749 B1 | 3/2010 | Golding et al. | |
| 7,792,641 B2 | 9/2010 | Liu et al. | |
| 8,072,370 B2 | 12/2011 | Woodington et al. | |
| 8,410,920 B2 | 4/2013 | Ito | |
| 8,812,193 B2 | 8/2014 | Lueke et al. | |
| 8,842,884 B2 | 9/2014 | Klein et al. | |
| 2001/0016798 A1 | 8/2001 | Kodaka et al. | |
| 2002/0031242 A1 * | 3/2002 | Yasui | G05D 1/0246 382/104 |
| 2004/0143381 A1 | 7/2004 | Regensburger et al. | |
| 2005/0259158 A1 | 11/2005 | Jacob et al. | |
| 2007/0158593 A1 | 7/2007 | Partin et al. | |
| 2007/0276600 A1 | 11/2007 | King et al. | |
| 2008/0027607 A1 | 1/2008 | Ertl et al. | |
| 2008/0042812 A1 | 2/2008 | Dunsmoir et al. | |
| 2008/0195292 A1 | 8/2008 | Naab et al. | |
| 2008/0204212 A1 | 8/2008 | Jordan et al. | |
| 2009/0037055 A1 | 2/2009 | Danner et al. | |
| 2009/0088966 A1 | 4/2009 | Yokoyama et al. | |
| 2009/0195414 A1 | 8/2009 | Riegel et al. | |
| 2010/0013917 A1 | 1/2010 | Hanna et al. | |
| 2010/0256852 A1 | 10/2010 | Mudalige | |
| 2010/0289632 A1 | 11/2010 | Seder et al. | |
| 2010/0329513 A1 * | 12/2010 | Klefenz | G01C 21/00 382/104 |
| 2011/0121993 A1 | 5/2011 | Davis et al. | |
| 2011/0190972 A1 | 8/2011 | Timmons et al. | |
| 2011/0199200 A1 | 8/2011 | Lueke et al. | |
| 2011/0313665 A1 | 12/2011 | Lueke et al. | |
| 2012/0139775 A1 | 6/2012 | Popovic | |
| 2012/0303258 A1 | 11/2012 | Pampus et al. | |
| 2014/0032047 A1 | 1/2014 | Voelz et al. | |
| 2014/0160250 A1 | 6/2014 | Pomerantz et al. | |
| 2014/0249722 A1 | 9/2014 | Hegemann et al. | |
| 2015/0105937 A1 | 4/2015 | Waldbauer et al. | |
| 2015/0146008 A1 | 5/2015 | Conner et al. | |

FOREIGN PATENT DOCUMENTS

| | | |
|---|---|---|
| DE | 102004018681 | 11/2005 |
| DE | 102005002719 | 8/2006 |
| DE | 102006020631 | 11/2007 |
| DE | 102006040333 | 3/2008 |
| DE | 102007013023 | 9/2008 |
| DE | 102007016868 | 10/2008 |
| DE | 102009003697 | 10/2010 |
| EP | 0 640 903 | 3/1995 |
| EP | 1 346 877 | 9/2003 |
| EP | 1 552 975 | 7/2005 |
| JP | 2009-023399 A | 2/2009 |
| WO | WO 2004/094186 | 11/2004 |
| WO | WO 2010/099789 | 9/2010 |

OTHER PUBLICATIONS

PCT International Preliminary Report on Patentability including English Translation of PCT Written Opinion of the International Searching Authority for International Application PCT/DE2013/200115, issued Mar. 3, 2015, 7 pages, International Bureau of WIPO, Geneva, Switzerland.

German Search Report for German Application No. 10 2012 107 885.8, dated Jul. 5, 2013, 5 pages, Muenchen, Germany, with English translation, 5 pages.

Xia Huang et al., "Lane Following System for a Mobile Robot Using Information from Vision and Odometry", IEEE CCECE 2011, 24th Canadian Conference, May 2011, Niagara Falls, Canada, pp. 1009 to 1013.

C. Blaschke, J. Schmitt, B. Färber; "Überholmanöver-Prädiktion über CAN-BUS-Daten"; ("Overtaking Maneuver Prediction via CAN-Bus Data"); Automobiltechnische Zeitschrift (ATZ), vol. 110, No. Nov. 2008, pp. 1022-1029.

M. Kretschmer, L. König, J. Neubeck, J. Wiedemann; "Erkennung und Prädiktion des Fahrverhaltens während eines Überholvorgangs"; ("Detection and Prediction of the Driver's Behavior during an Overtaking Maneuver"); 2. Tagung Aktive Sicherheit durch Fahrerassistenz, Garching, Germany, 2006, with English abstract, pp. 1 to 17, FKFS-IVK.

C. Wojek, B. Schiele; "A Dynamic Conditional Random Field Model for Joint Labeling of Object and Scene Classes"; European Conference on Computer Vision (ECCV), Marseille, France, 2008, ECCV 2008, Part IV, LNCS 5305, pp. 733-747.

* cited by examiner

METHOD FOR DETERMINING A COURSE OF A TRAFFIC LANE FOR A VEHICLE

FIELD OF THE INVENTION

The invention relates to a method for determining a course of a traffic lane for a vehicle using image data acquired by an image acquisition unit.

BACKGROUND INFORMATION

A method of a related general type is known from, e.g., DE 10 2007 013 023 A1, in which the surroundings of the vehicle are covered or monitored by a surroundings sensor and are subdivided, for the detection of objects in the surroundings of the vehicle, into grid cells. To each of these grid cells, a value indicating the probability of occupancy for the presence of an object in the respective grid cell is assigned, wherein the value of 0 or a low value being in the range of probability near 0 is assigned to a grid cell that has no detected object or that is hidden, whereas a high value (e.g., between 0.5 and 1) is assigned to an occupied grid cell. In particular, in this method known from DE 10 2007 013 023 A1, a value depending on the distance between a free grid cell and the vehicle is assigned to each grid cell, i.e., the greater the distance to the free grid cell, the higher the selected probability of occupancy.

The coordinate system of the grid-based surroundings map generated by this known method according to DE 10 2007 013 023 A1 is connected to the global coordinate system in a rotationally fixed manner so that the vehicle representation is moved on the two-dimensional grid structure of the surroundings map when the actual vehicle moves.

This grid-based surroundings map generated in this manner according to DE 10 2007 013 023 A1 is used to detect a pavement, a vehicle corridor and/or pavement boundaries. For this purpose, a region on the grid-based surroundings map in which the probabilities of occupancy are below a predetermined value (e.g., 0.1) is determined in a first step. Within this region, a center line extending in the longitudinal direction of the vehicle is determined and subdivided into several partial lines. These partial lines are then displaced, perpendicularly to the direction of the center line, to both sides of the vehicle until they are displaced to grid cells whose probabilities of occupancy exceed a particular value, e.g., 0.5. These partial lines displaced in this manner are connected to each other, which is followed by a check whether the connecting line resulting therefrom describes a model given for the presence of a pavement, a vehicle corridor and/or a pavement boundary, e.g., a straight line, a clothoid, a polygon, a polynomial, a parabola, or a spline.

Finally, it is also possible, by means of the grid-based surroundings map generated according to DE 10 2007 013 023 A1, to locate the ego-vehicle on this surroundings map by means of the surroundings sensor.

However, the results of the method for determining a course of a traffic lane for a vehicle described in DE 10 2007 013 023 A1 are not satisfactory in all traffic situations. In particular, the results are not satisfactory when there are no or too few measurements for updating the grid-based surroundings map due to low driving speed or due to a covered (in particular, by vehicles driving ahead of the ego-vehicle) visual range of the surroundings sensor.

Another method for detecting and tracking structures that demarcate a traffic lane and/or a pavement is known from, e.g., DE 10 2009 003 697 A1, in which the surroundings of a vehicle are covered by means of a camera and an image-processing algorithm is used that analyzes, in the acquired images, structures that are characteristic of a traffic lane and/or a pavement and the course thereof, e.g., pavement markings or pavement verges, such as crash barriers and the like. The image-processing algorithms employed detect markings especially due to the dark-to-bright/bright-to-dark transitions between the pavement surface and the pavement markings. Furthermore, the images are searched for structures that exhibit the highest contrast since such structures are mostly generated by the above-mentioned transitions.

In these known methods that detect bright-to-dark/dark-to-bright transitions and supply them to a filtering algorithm, filtering algorithms are used that depend on the speed of the vehicle, such as a Kalman filter using a clothoid model. With such a model-based filter, the estimation of the lane position is based on two data inputs: from the position of the measurements and from the vehicle's own motion. If no more measurements are received when the speed of the vehicle is low or the visual range is covered by the vehicle driving ahead of the ego-vehicle, tracking may continue and will only use the vehicle's own motion in this case.

One problem of this procedure consists in the fact that at a low vehicle speed, an incorrectly assumed angle or an incorrectly estimated curvature of the course of the lane results in a "turning-away" of the lane, which means that, e.g., a bend is estimated instead of a straight line or a straight line is estimated instead of a bend. Therefore, also such a method can only be employed at higher vehicle speeds.

SUMMARY OF THE INVENTION

An object of at least one embodiment of the invention is to specify a method for determining a course of a traffic lane for a vehicle, said method being improved over the prior art and, in particular, enabling the course of the traffic lane to be tracked even at low vehicle speeds and for areas in the field of view of the surroundings sensor that are blocked.

The above object can be achieved by at least one embodiment of a method with the features as set forth herein.

According to an embodiment of the invention, such a method for determining a course of a traffic lane for a vehicle, in which structures that demarcate a trafficable space are detected by means of at least one image acquisition unit and these structures are plotted on a surroundings map that subdivides the surroundings of the vehicle into a two-dimensional grid structure of cells, is characterized in that
  the position of the vehicle in the grid structure of the surroundings map is determined and continually updated by means of odometric data of the vehicle,
  the distance and the direction of the vehicle with respect to those cells of the grid structure of the surroundings map which feature structures that demarcate the pavement and/or the traffic lane are determined,
  bright-to-dark and dark-to-bright transitions in the image data generated by the image acquisition unit are detected and are plotted on the cells of the grid structure of the surroundings map and
  the course of the traffic lane is determined from the cells with the detected bright-to-dark and dark-to-bright transitions.

Structures that demarcate a space that is fit for traffic are both the structures that demarcate a pavement/a traffic lane and structures that demarcate, e.g., a parking lot, such as pavement boundaries, e.g., curbstones, median strips, pavement markings or line markings in the middle of the pavement or on a side of the pavement etc. and road signs including delineator posts etc.

By means of this inventive method, the lane information is received at very low speeds and also when the distances to vehicles driving ahead of the ego-vehicle that cover, e.g., line markings are small.

Because all bright-to-dark and dark-to-bright transitions are plotted on the grid cells of the surroundings map, the lane markings can be tracked, wherein at first all forms of lane markings can be advantageously detected, i.e., including bright-to-dark and dark-to-bright transitions that result from other road markings, such as turn arrows, road signs indicating speed information, or pedestrian crosswalks etc. Another advantage consists in the fact that the use of a grid-based surroundings map enables lane markings already passed by the vehicle to be included in the method. The error rate with lane marking detection is very low since the amount of deviation of the vehicle from the middle of the lane, the angular position of the vehicle and the curvature of a lane marking are continually updated.

An advantageous realization of the invention provides that if there are no image data from that region of the surroundings which is in front of the vehicle, the determined course of the traffic lane will be extrapolated into that region of the surroundings which is in front of the vehicle. The further course of the traffic lane/pavement estimated in this manner is particularly advantageous when the vehicle moves in urban traffic, particularly in dense traffic or densely built-up areas.

According to a further preferred further development of the invention, a stationary coordinate system is used for the surroundings map, thereby minimizing quantization errors in image processing and in the generation of the grid-based surroundings map.

The inventive method becomes particularly efficient when bright-to-dark and dark-to-bright transitions that are present in a line structure are detected, thereby enabling, in particular, verges/lane boundaries in the form of line markings to be detected quickly and easily.

According to a further realization of the invention, the inventive method becomes particularly robust when the grid cells of the surroundings map are classified as grid cells that can be driven over or cannot be driven over. To this end, the structures and objects of the surroundings detectable from the image data of the image acquisition unit are detected and plotted on the grid cells.

According to a further development, the odometric data are determined by means of sensors belonging to the vehicle. Usually, said sensors are already present in vehicles, particularly in motor vehicles.

Furthermore, a preferred further development of the invention provides that in addition to the odometric data, the optical flow from the image data of the image acquisition unit is used to determine the position of the vehicle in the grid structure of the surroundings map, whereby states of the vehicle (e.g., wheelspin or skidding of the vehicle) can be taken into account.

Finally, according to a last realization of the invention, it is possible, by means of the image acquisition unit, to detect vehicles driving parallel to the ego-vehicle, to determine the distances (transversely to the direction of motion of the ego-vehicle) to the vehicles driving parallel to the ego-vehicle, and to use the determined distances to the vehicles driving parallel to the ego-vehicle to verify the determined course of the traffic lane, thereby supporting lane detection in an advantageous manner.

BRIEF DESCRIPTION OF THE DRAWINGS

In the following, the invention will be explained in greater detail with reference to the attached figures, in which.

DETAILED DESCRIPTION OF EXAMPLE EMBODIMENTS OF THE INVENTION

Figure 1:
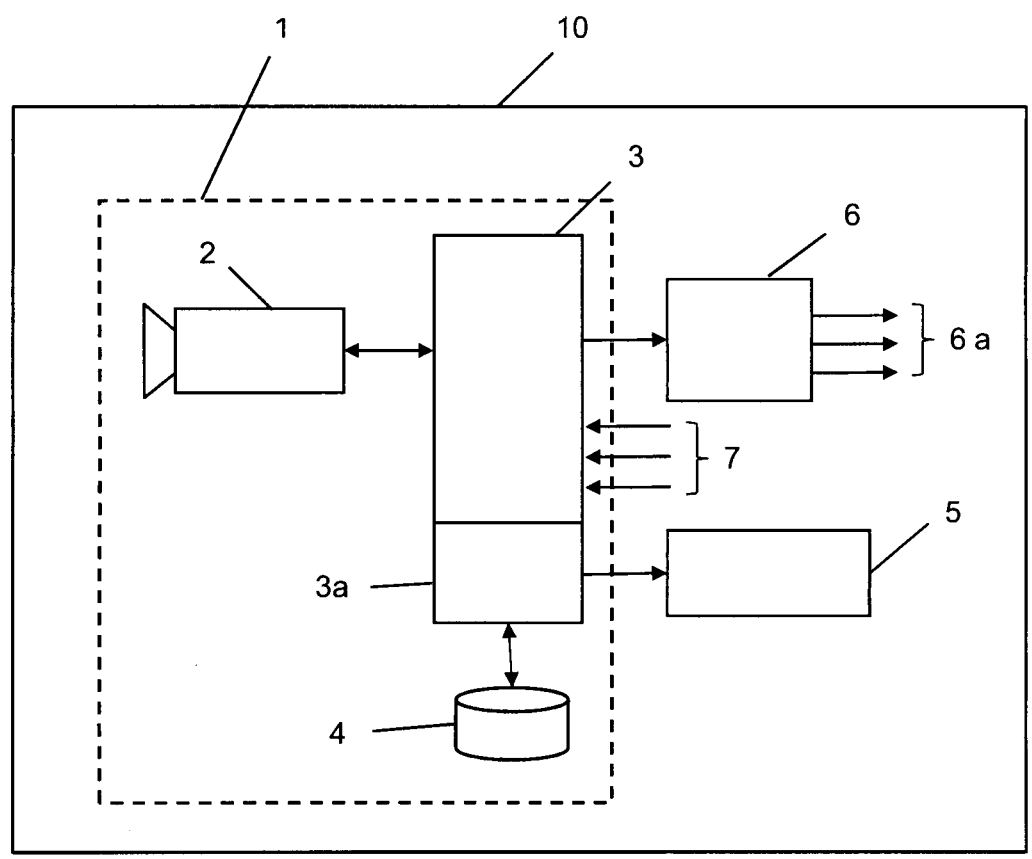
FIG. 1 shows a schematic representation of a vehicle with an image acquisition unit for explaining the inventive method and FIG. 2 shows a schematic representation of a grid-based surroundings map of a vehicle generated by means of the inventive method and FIG. 3 shows a flow chart for generating a grid-based surroundings map according to FIG. 2 by means of the image acquisition system associated to the vehicle according to FIG. 1 as an exemplary embodiment according to the invention.

The vehicle 10 schematically shown in FIG. 1, a motor vehicle in particular, comprises an image acquisition system 1 with a camera 2 as an image acquisition unit, an object detection unit 3 for detecting objects from the image data acquired by the camera 2, wherein a memory 4 is associated with the object detection unit 3. For object detection, the object detection unit 3 has a classifier 3a that is used to classify, by means of a pattern recognition algorithm, detected structures and objects, particularly objects located on the verge and detected in the image data generated by the camera 2. It is thus not only possible to detect structures that demarcate the pavement/the traffic lane, such as pavement markings, pavement boundaries, e.g., crash barriers and curbstones, and road signs, but also, e.g., vehicles driving ahead of the ego-vehicle or vehicles driving parallel to the ego-vehicle, tail lights, headlights etc.

Furthermore, the image acquisition system 1 also determines the course of the traffic lane/pavement of the vehicle 10 and uses it for driver assistance functions. For example, a driver assistance system 6 designed as a lane-keeping assistance system is provided. Said lane-keeping assistance system is supplied with the information about the detected course of the road and intervenes, if necessary, in the braking and/or steering system of the vehicle 10 by means of control units 6a, said information being required for lane keeping.

Furthermore, the vehicle 10 comprises a display 5 that is, e.g., part of a central display and operating unit of the vehicle 10 or is an instrument cluster of the vehicle 10 that displays the objects (e.g., road signs) detected by the object detection unit 3 and is therefore connected thereto. Moreover, visual and/or acoustic warnings for the driver will be given/generated if an unintentional deviation from the detected traffic lane/pavement is detected.

Finally, the image acquisition system 1 is also supplied with odometric data of the vehicle 10 for the estimation of the motion thereof, wherein, for this purpose, vehicle sensors 7 detect, e.g., the yaw rate, the steering angle and the wheel speeds of the vehicle.

Figure 2:
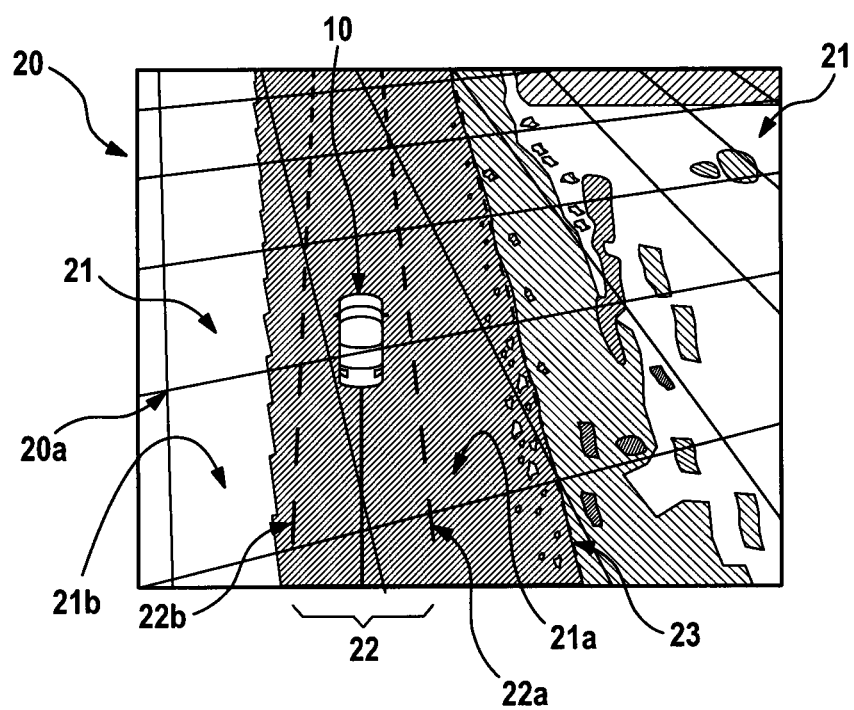
Figure 3:
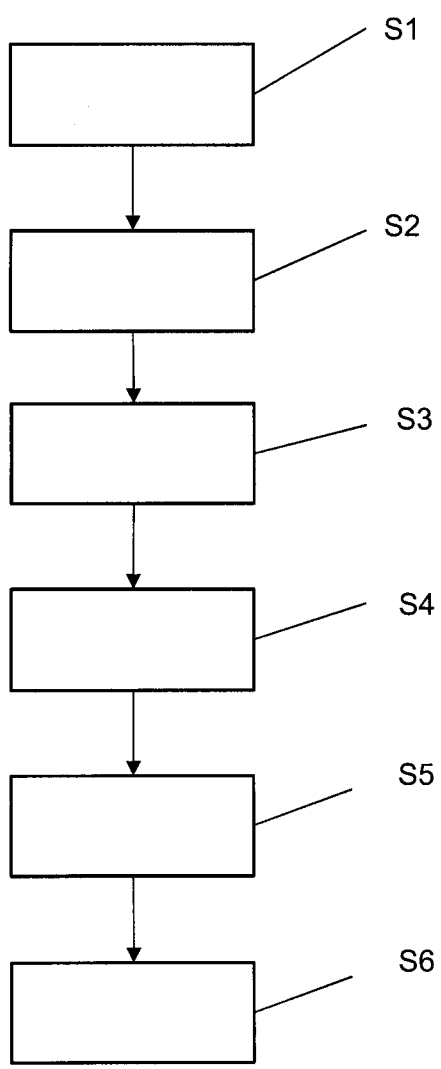

In the following, a method for determining the course of the traffic lane of the vehicle 10 in a traffic environment will be described and explained as an exemplary embodiment of the invention on the basis of FIGS. 1, 2 and 3.

In a first procedure step S1, the surroundings of the vehicle covered by the camera 2 is rasterized, in the form of the image data, into grid cells 21 of a stationary/global grid 20a having equally sized meshes, to form a grid-based surroundings map 20 (see FIG. 2) that quantizes the surroundings covered by the camera 2. In FIG. 2, only every tenth grid line is plotted for the sake of clarity.

In a next procedure step S2, objects are detected from the image data of the camera 2, classified by means of the classifier 3a, and plotted on the grid cells 21 with a probability of occupancy. Depending on the value of the probability of occupancy (e.g., when the value is ≥0.5), the status "cannot be driven over" (grid cells 21b) and the status "can be driven over" (grid cells 21a), respectively, is assigned to the grid cells 21. In FIG. 2, the areas, e.g. the grid cells 21a that can be driven over are diagonally lined to be darker than the areas, e.g. the grid cells 21b that cannot be driven over.

According to a next procedure step S3, the odometric data generated by the sensors 7 are entered into this grid-based surroundings map 20 and the position of the vehicle 10 is plotted on the corresponding grid cell 21a. By means of the continually generated odometric data, the motion of the vehicle 10 is estimated and the position thereof is displaced on the surroundings map 20 according to said estimation of motion.

For estimating the motion of the vehicle 10, information from the optical flow of the camera 2 may be used, in addition to the odometric data (e.g., yaw angle, steering angle and wheel speeds), to confirm the estimated position.

In a further procedure step S4, the distance and the direction of the vehicle 10 with respect to the grid cells 21b that cannot be driven over and feature structures that demarcate the traffic lane and/or pavement can be determined by means of the position of the vehicle 10 plotted on the grid structure 20a of the surroundings map 20.

All bright-to-dark and dark-to-bright transitions that are present in a line structure are detected and are also plotted on the surroundings map 20 (cf. FIG. 2) in a subsequent procedure step S5 and identified as lane markings 22a and 22b of a traffic lane 22 and as a right pavement marking 23 and tracked using a particle filter in a last procedure step S6, wherein also the lane markings 22a, 22b already passed by the vehicle 10 and structures 23 that demarcate the pavement are included in the determination of the course of the traffic lane of the vehicle 10. The described method enables the lane markings 22a, 22b and the structures 23 that demarcate the pavement to be tracked even at low speeds.

By means of this method, bright-to-dark and dark-to-bright transitions that result from other road markings (e.g., turn arrows, speed information of road signs or pedestrian crosswalks etc.) can also be detected.

If there are no image data (e.g., if the visual range is covered by vehicles driving ahead of the ego-vehicle), the course of the traffic lane 22/pavement 23 determined by then will be extrapolated into that region of the surroundings which is in front of the vehicle 10.

Concerning the determination of the course of the traffic lane of the vehicle 10, the described method may also be improved by detecting vehicles driving parallel to the vehicle 10 so that such an object driving parallel to the vehicle 10 can be prevented from being touched by the vehicle 10 if the traffic lane is narrowed.

In the exemplary embodiment described above, a camera 2 (may also be a stereo camera) generating video data is used as an image acquisition unit. Instead of such a camera 2, a laser generating laser scanner data may be used to carry out the inventive method.

REFERENCE NUMERALS 1 image acquisition system
2 image acquisition unit, camera
3 object detection unit
3a classifier
4 memory
5 display
6 driver assistance system
6a control units of driver assistance system 6
7 vehicle sensors
10 vehicle, motor vehicle
20 surroundings map
20a stationary grid of surroundings map 20
21 grid cell of surroundings map 20
21a grid cell 21 that can be driven over
21b grid cell 21 that cannot be driven over
22 traffic lane of vehicle 10
22a right lane marking
22b left lane marking
23 right pavement marking

The invention claimed is:

1. Method for determining a course of a traffic lane for a subject vehicle (10), comprising:
    detecting structures that demarcate a trafficable space from image data provided by at least one image acquisition unit (2),
    plotting the structures on a surroundings map (20) that subdivides surroundings of the subject vehicle into a two-dimensional grid structure (20a) of cells (21),
    determining and continually updating a position of the subject vehicle in the grid structure (21) of the surroundings map (20) by at least odometric data of the subject vehicle (10),
    determining a distance and a direction of the subject vehicle (10) with respect to particular cells (21b) of the grid structure (20a) of the surroundings map (20) which feature physical structures that cannot be driven over by the subject vehicle and that demarcate a boundary of a pavement and/or the traffic lane,
    detecting bright-to-dark and dark-to-bright transitions in the image data and plotting the transitions on the cells (21) of the grid structure (20a) of the surroundings map (20), and
    determining the course of the traffic lane (22) from at least the cells having the detected bright-to-dark and dark-to-bright transitions.

2. Method according to claim 1, characterized in that if there are no image data from a region of the surroundings which is in front of the subject vehicle (10), the determined course of the traffic lane (22) will be extrapolated into the region of the surroundings which is in front of the subject vehicle (10).

3. Method according to claim 1, characterized in that a stationary coordinate system is used for the surroundings map (20).

4. Method according to claim 1, characterized in that only those bright-to-dark and dark-to-bright transitions that represent a line structure are detected.

5. Method according to claim 1, characterized in that the grid cells (21) of the surroundings map are classified respectively as grid cells that can be driven over or cannot be driven over.

6. Method according to claim 1, characterized in that the odometric data are determined by sensors (7) belonging to the subject vehicle.

7. Method according to claim 1, characterized in that in addition to the odometric data, an optical flow from the image data of the image acquisition unit (2) is used to determine the position of the subject vehicle (10) in the grid structure (20a) of the surroundings map (20).

8. Method according to claim 1, further comprising:
    detecting other vehicles driving parallel to the subject vehicle (10) by the image acquisition unit (2),
    determining distances, transversely to a direction of motion of the subject vehicle, to the other vehicles driving parallel to the subject vehicle, and
    verifying the course of the traffic lane based on the distances to the other vehicles.

9. Method according to claim 1, wherein the determining of the course of the traffic lane is further based on consideration of the particular cells of the grid structure which feature the physical structures that cannot be driven over by the subject vehicle and that demarcate the boundary of the pavement and/or the traffic lane.

10. Method according to claim 1, wherein the image acquisition unit comprises a laser scanner and the image data are laser scan data.

11. A method of determining a course of a traffic lane on a roadway on which a vehicle is driving, comprising:
- with an image acquisition device of the vehicle, acquiring image data of surroundings of the vehicle including the roadway;
- evaluating the image data to detect brightness transitions therein;
- evaluating the image data to detect, in the surroundings, physical structures that cannot be driven over by the vehicle, and that bound the roadway or the traffic lane;
- forming a surroundings map by plotting the brightness transitions and the physical structures on a two-dimensional stationary grid of grid cells;
- among the grid cells, identifying first cells containing the brightness transitions and second cells containing the physical structures; and
- with odometric sensors of the vehicle, acquiring odometric data regarding the vehicle;
- from at least the odometric data, determining and updating a position of the vehicle on the grid of the surroundings map; and
- determining the course of the traffic lane from the first cells and the second cells.

* * * * *